US012316786B2

(12) United States Patent
Schmidt

(10) Patent No.: US 12,316,786 B2
(45) Date of Patent: May 27, 2025

(54) SECURE MEDIUM INTRUSION PREVENTION

(71) Applicant: SCHNEIDER ELECTRIC IT CORPORATION, West Kingston, RI (US)

(72) Inventor: Michael Kenneth Schmidt, St. Charles, MO (US)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 851 days.

(21) Appl. No.: 17/111,969

(22) Filed: Dec. 4, 2020

(65) Prior Publication Data

US 2022/0182247 A1    Jun. 9, 2022

(51) Int. Cl.
| | |
|---|---|
| *H04L 9/32* | (2006.01) |
| *G06F 13/40* | (2006.01) |
| *G06F 13/42* | (2006.01) |
| *H04L 9/08* | (2006.01) |

(52) U.S. Cl.
CPC ........ *H04L 9/3271* (2013.01); *G06F 13/4063* (2013.01); *G06F 13/4282* (2013.01); *H04L 9/0825* (2013.01); *G06F 2213/0026* (2013.01)

(58) Field of Classification Search
CPC ............. G06F 13/4063; G06F 13/4282; G06F 2213/0026; H04L 9/0825; H04L 9/3247; H04L 9/3271
See application file for complete search history.

(56) References Cited

U.S. PATENT DOCUMENTS

| | | | | |
|---|---|---|---|---|
| 7,877,788 B1 * | 1/2011 | Topp | ...................... | G06F 21/44 |
| | | | | 726/17 |
| 7,940,932 B2 * | 5/2011 | Paksoy | ................. | H04W 12/48 |
| | | | | 713/172 |
| 8,332,641 B2 * | 12/2012 | Case | ................... | G06F 11/3656 |
| | | | | 713/168 |

(Continued)

FOREIGN PATENT DOCUMENTS

| | | |
|---|---|---|
| CN | 104639566 A | 5/2015 |
| EP | 3408987 B1 | 11/2019 |

OTHER PUBLICATIONS

Machine Translation of JP2008-304987, published Dec. 18, 2008 and obtained Sep. 14, 2023) (Year: 2008).*

*Primary Examiner* — Sharon S Lynch
(74) *Attorney, Agent, or Firm* — Lando & Anastasi, LLP

(57) ABSTRACT

Examples of the disclosure include a host system comprising an authentication communication medium interface configured to be communicatively coupled to a connected module, a secure communication medium interface, and a controller configured to detect a connection of the connected module to the host system over a physical communication connection, generate an authentication challenge, provide the authentication challenge to the connected module over a physical authentication connection via the authentication communication medium interface, receive a challenge response to the authentication challenge from the connected module via the authentication communication medium interface, verify the challenge response, and grant the connected module access to host system data over the physical communication connection via the secure communication medium interface based on successful verification of the challenge response.

20 Claims, 4 Drawing Sheets

(56) References Cited

U.S. PATENT DOCUMENTS

| | | | | |
|---|---|---|---|---|
| 8,869,273 | B2* | 10/2014 | Srivastava | G06F 21/554 |
| | | | | 726/22 |
| 9,588,563 | B2* | 3/2017 | Rathi | G06F 1/266 |
| 9,727,123 | B1* | 8/2017 | Nayak | G06F 13/4282 |
| 9,875,354 | B1* | 1/2018 | Srivastava | G06F 21/606 |
| 10,250,580 | B2 | 4/2019 | Bailey et al. | |
| 10,254,820 | B2* | 4/2019 | Nayak | G06F 1/266 |
| 10,362,483 | B2* | 7/2019 | Frusina | H04W 12/06 |
| 10,678,913 | B2* | 6/2020 | Srivastava | G06F 21/554 |
| 10,678,950 | B2* | 6/2020 | Bush | G05B 19/048 |
| 10,742,421 | B1* | 8/2020 | Wentz | H04L 9/0897 |
| 10,802,571 | B2* | 10/2020 | Nayak | G06F 13/4072 |
| 10,958,435 | B2* | 3/2021 | Spanier | H04L 9/3236 |
| 11,250,132 | B2* | 2/2022 | Appleboum | G06F 21/567 |
| 11,544,416 | B2* | 1/2023 | Appleboum | G06F 21/577 |
| 11,663,313 | B2* | 5/2023 | Bishop | G06F 21/45 |
| | | | | 726/17 |
| 11,757,658 | B2* | 9/2023 | Wentz | H04L 9/3073 |
| | | | | 713/176 |
| 2006/0129848 | A1* | 6/2006 | Paksoy | G06F 21/35 |
| | | | | 713/193 |
| 2007/0083939 | A1* | 4/2007 | Fruhauf | G06F 21/85 |
| | | | | 726/34 |
| 2008/0303631 | A1* | 12/2008 | Beekley | G06F 21/79 |
| | | | | 340/5.74 |
| 2009/0259848 | A1 | 10/2009 | Williams et al. | |
| 2009/0327724 | A1* | 12/2009 | Shah | H04W 12/50 |
| | | | | 713/169 |
| 2010/0199077 | A1* | 8/2010 | Case | G06F 11/3656 |
| | | | | 713/1 |
| 2014/0337957 | A1 | 11/2014 | Feekes | |
| 2015/0346792 | A1* | 12/2015 | Rathi | G06F 1/26 |
| | | | | 713/310 |
| 2016/0182539 | A1* | 6/2016 | Edwards | G06F 21/82 |
| | | | | 726/23 |
| 2017/0180137 | A1* | 6/2017 | Spanier | H04L 9/3247 |
| 2017/0289800 | A1* | 10/2017 | Frusina | H04L 63/0876 |
| 2017/0351320 | A1* | 12/2017 | Nayak | G06F 1/3287 |
| 2018/0210517 | A1* | 7/2018 | Yun | G06F 3/0679 |
| 2018/0293408 | A1* | 10/2018 | Young | G06F 21/32 |
| 2019/0236313 | A1* | 8/2019 | Bush | H04L 63/0823 |
| 2019/0278360 | A1* | 9/2019 | Nayak | G06F 1/3287 |
| 2019/0297497 | A1* | 9/2019 | Frusina | H04W 12/06 |
| 2020/0351098 | A1* | 11/2020 | Wentz | H04L 9/3247 |
| 2020/0351657 | A1* | 11/2020 | Wentz | H04L 9/3231 |
| 2021/0012893 | A1* | 1/2021 | Stahl | H04L 9/0825 |
| 2021/0176073 | A1* | 6/2021 | Spanier | H04L 9/3239 |
| 2022/0092003 | A1* | 3/2022 | Aharony | G06F 1/20 |
| 2022/0092167 | A1* | 3/2022 | Bishop | G06F 21/45 |

* cited by examiner

SECURE MEDIUM INTRUSION PREVENTION

BACKGROUND

1. Field of the Disclosure

At least one example in accordance with the present disclosure relates generally to providing technological improvements to secure communications between electronic devices.

2. Discussion of Related Art

Electronic devices may communicate with other electronic devices to exchange various information across wired and/or wireless media. In examples in which the exchanged information is sensitive, critical, or otherwise private information, communicating devices may secure communications. For example, a communicating device may encrypt the private information or authenticate a receiving device before communicating with the receiving device.

SUMMARY

According to at least one aspect of the present disclosure, a method of controlling access to a physical communication connection of a host system is provided, the method comprising detecting, by the host system, a connection of a connected module to the host system over the physical communication connection, generating, by the host system, an authentication challenge responsive to detecting the connection of the connected module to the host system, providing, by the host system, the authentication challenge to the connected module over a physical authentication connection via an authentication communication medium interface, receiving, by the host system, a challenge response based on the authentication challenge from the connected module via the authentication communication medium interface, analyzing, by the host system, the challenge response, and determining, by the host system, whether to grant the connected module access to host system data over the physical communication connection via the secure communication medium based on the analyzing of the challenge response.

In various examples, the method includes signing, by the host system, the authentication challenge. In some examples, the method includes analyzing, by the connected module, the authentication challenge using a public key of the host system. In at least one example, the method includes generating, by the connected module, the challenge response using a private key of the connected module. In various examples, analyzing the challenge response includes decrypting the challenge response using a public key of the connected module.

According to at least one aspect of the disclosure, a host system is provided comprising an authentication communication medium interface configured to be communicatively coupled to a connected module, a secure communication medium interface, and a controller configured to detect a connection of the connected module to the host system over a physical communication connection, generate an authentication challenge, provide the authentication challenge to the connected module over a physical authentication connection via the authentication communication medium interface, receive a challenge response to the authentication challenge from the connected module via the authentication communication medium interface, verify the challenge response, and grant the connected module access to host system data over the physical communication connection via the secure communication medium interface based on successful verification of the challenge response.

In at least one example, the controller is further configured to sign the authentication challenge with a private key of the host system. In various examples, verifying the challenge response comprises decrypting the challenge response using a public key of the connected module. In some examples, the host system further includes a secure communication medium and a multiplexer, the multiplexer being configured to selectively connect the connected module to the secure communication medium via the secure communication medium interface to grant the connected module access to the host system data over the physical communication connection responsive to the controller successfully verifying the challenge response.

In at least one example, the multiplexer includes at least one of an electrical switch or an optocoupler switchably connecting the connected module to the secure communication medium, and wherein selectively connecting the connected module to the secure communication medium includes controlling, by the controller, the multiplexer to operate the at least one of the electrical switch or the optocoupler to connect the connected module to the secure communication medium. In various examples, the multiplexer includes a network switch having a communication port communicatively coupled to the connected module, wherein selectively connecting the connected module to the secure communication medium includes operating, by the controller, the network switch to enable the communication port.

In some examples, the physical authentication connection is a serial bus connection. In at least one example, the serial bus connection includes at least one of a Universal Serial Bus, peripheral component interconnect, Personal Computer Memory Card International Association, or Recommended Standard 232 connection. In various examples, the physical communication connection includes at least one of a peripheral component interconnect express connection or a local area network connection. In some examples, the host system further comprises a host printed circuit board (PCB) configured to be coupled to a backplane, wherein the backplane includes the physical communication connection and the physical authentication connection, and wherein the connected module includes a module PCB configured to be coupled to the backplane. In at least one example, the controller generates the authentication challenge responsive to detecting the connection of the connected module to the host system.

According to at least one example, a non-transitory computer-readable medium storing thereon sequences of computer-executable instructions for controlling access to a physical communication connection of a host system is provided, the sequences of computer-executable instructions including instructions that instruct at least one processor to detect, by the host system, a connection of a connected module to the host system over the physical communication connection, generate an authentication challenge, provide the authentication challenge to the connected module over a physical authentication connection via an authentication communication medium interface, receive a challenge response to the authentication challenge from the connected module via the authentication communication medium interface, verify the challenge response, and grant the connected module access to host system data over the physical communication connection based on successful verification of the challenge response.

In at least one example, generating the authentication challenge includes signing the authentication challenge with a private key of the host system. In various examples, verifying the challenge response includes decrypting the challenge response using a public key of the connected module. In some examples, the host system includes a secure communication medium and a multiplexer, wherein granting the connected module access to the host system data over the physical communication connection includes operating the multiplexer to operate at least one of an electrical switch or an optocoupler to couple the connected module to the secure communication medium.

In at least one example, the host system includes a network switch having a communication port communicatively coupled to the connected module, wherein granting the connected module access to the host system data includes operating the network switch to enable the communication port. In some examples, providing the authentication challenge to the connected module via the physical authentication connection includes providing the authentication challenge to the connected module via a serial bus connection. In various examples, the serial bus connection includes at least one of a Universal Serial Bus, peripheral component interconnect, Personal Computer Memory Card International Association, or Recommended Standard 232 connection. In at least one example, granting the connected module access to the physical communication connection includes granting the connected module access to at least one of a peripheral component interconnect express connection or a local area network connection.

According to at least one example, a connected module is provided comprising a module authentication medium interface configured to be communicatively coupled to a host system, a module secure medium interface, and a module controller configured to receive, from the host system via the module authentication medium interface, an authentication challenge, generate an authentication challenge response to the authentication challenge, provide the authentication challenge response to the host system over a physical authentication connection via the module authentication medium interface, and receive access to a secure medium of the host system via the module secure medium interface based on successful verification of the authentication challenge response.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
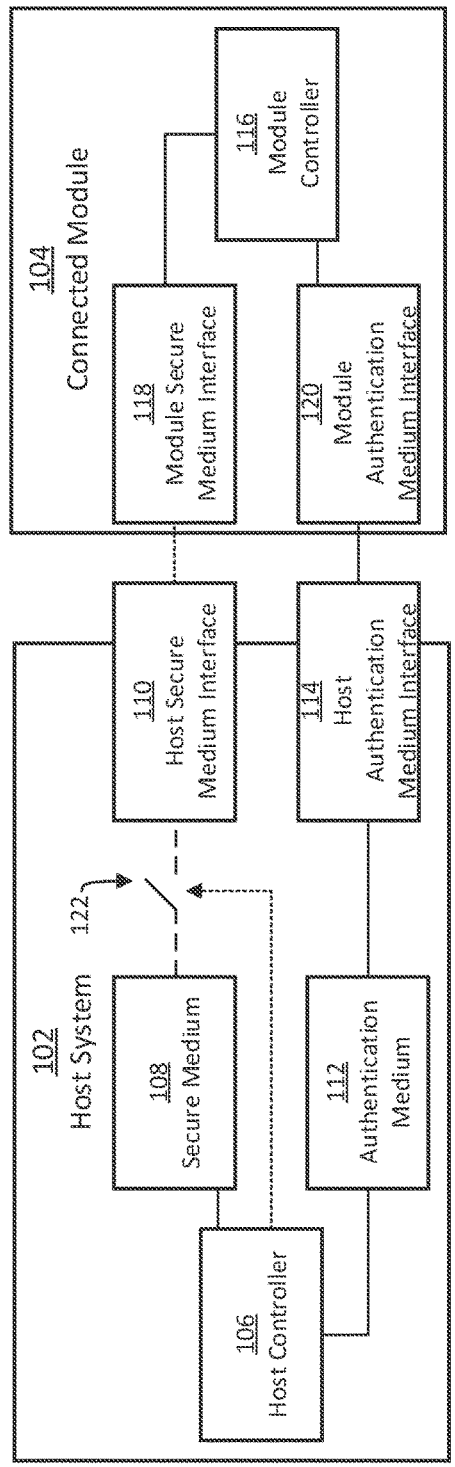
FIG. 1 illustrates a block diagram of a communication system according to an example.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are no intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

In various technological fields, electronic devices are configured to communicate with one another to exchange information. Securing communications between, and access to, electronic devices is advantageous in many fields, particularly in examples in which devices exchange sensitive, critical, or otherwise private data and/or information (collectively referred to herein as "private information"). It may therefore be advantageous to control access to a communication channel or medium through which devices exchange private information such that only authorized devices are capable of accessing the communication channel or medium.

Enabling secure communications between electronic devices is a technical problem. Examples of the present disclosure provide technological improvements to secure communication technology by providing a technological solution to this technical problem, namely, by providing a secure communication medium and an authentication communication medium through which devices communicate. The media may be separate such that access to one medium does not automatically grant access to other media. The secure communication medium may be accessible only to authorized devices, such that the authorized devices may exchange private information without the information being accessible to unauthorized devices.

To gain access to the secure communication medium, an unauthorized device may undergo an authorization process via the authentication communication medium. For example, a host system may communicate with the unauthorized device via the authentication communication medium to authenticate the unauthorized device. The host system may grant the unauthorized device access to the secure communication medium only after authenticating the unauthorized device via the authentication communication medium.

Unauthorized devices may therefore be unable to access the secure communication medium until being authorized via a separate communication medium through which private information is not sent. In contrast with systems in which authentication is performed by exchanging information via the same medium through which private information is sent, examples provided herein improve communication security by providing a separate authentication medium and secure communication medium. Accordingly, the technical solution described herein provides technological improvements at least to secure communication technology by controlling access to a secure communication medium and thereby mitigating or avoiding cloning and snooping with respect to existing authenticated communication. Further technological improvements are provided by limiting access for certain modules to the secure communication medium, such as modules that are incompatible with a host system or which are not approved (for example, genuine) modules, which provides technological improvements to the technical field of device access control.

FIG. 1 illustrates a block diagram of a communication system 100 according to an example. The communication system 100 includes a host system 102 and a connected module 104. The host system 102 may include one or more devices configured to exchange information with one another, and/or may provide a medium through which one or more devices communicate. The connected module 104 may be or include a device or component that is attempting to gain access to the host system 102 such that the connected module 104 is capable of exchanging information with or via the host system 102. However, the host system 102 may not grant the connected module 104 access to the host system 102 until the host system 102 has authenticated the connected module 104. A single connected module 104 is illustrated for purposes of explanation in FIG. 1, but in other examples, the host system 102 may be connected to multiple connected modules as discussed with respect to FIG. 4.

The host system 102 includes a host controller 106, a secure medium 108, a host secure medium interface 110, an authentication medium 112, a host authentication medium interface 114, and a connection modulator 122. The connected module 104 includes a module controller 116, a module secure medium interface 118, and a module authentication medium interface 120.

In some examples, the host system 102 includes a host housing in which the components of the host system 102 (including, for example, the components 106-114, 122) are disposed. One or more of the components of the host system 102 may be completely or partially disposed within the host housing. For example, the interfaces 110, 114 may be partially disposed within the host housing, but may also be partially external to the host housing of the host system 102 to enable devices, components, and/or modules external to the host system 102 (including, for example, the connected module 104) to interface with the host system 102.

In some examples, the connected module 104 includes a module housing in which the components of the connected module 104 (including, for example, the components 116-120) are disposed. The module housing may be a separate housing than that which the host system 102 may include. One or more of the components of the connected module 104 may be completely or partially disposed within the module housing. For example, the interfaces 118, 120 may be partially disposed within the module housing, but may also be partially external to the module housing to enable devices, components, and/or modules external to the connected module 104 (including, for example, the host system 102) to interface with the connected module 104.

In various examples, the host system 102 includes a host printed circuit board (PCB) to physically and/or electrically couple components of the host system 102 to one another. For example, each of the components 106-114, 122 may be electrically and/or physically coupled to one or more other components of the components 106-114, 122 via a PCB. Furthermore, sub-components of each of the components 106-114, 122 may be electrically and/or physically interconnected via a PCB. In other examples, components and/or sub-components of the host system 102 may be physically and/or electrically coupled via techniques other than or in addition to implementing a PCB, such as by implementing point-to-point or wire-wrap techniques. In some examples, the connected module 104 may include a module PCB to physically and/or electrically couple components of the connected module 104 to one another. For example, each of the components 116-120 may be electrically and/or physically coupled to one or more other components of the components 116-120 via a PCB. Furthermore, sub-components of each of the components 116-120 may be electrically and/or physically interconnected via a PCB. In other examples, components of the connected module 104 may be physically and/or electrically coupled via techniques other than or in addition to implementing a PCB, such as by implementing point-to-point or wire-wrap techniques.

The host controller 106 is communicatively coupled to the secure medium 108 and the authentication medium 112. The secure medium 108 is communicatively coupled to the host controller 106, and is configured to be switchably communicatively coupled to the host secure medium interface 110. The host secure medium interface 110 is configured to be switchably communicatively coupled to the secure medium 108 via the connection modulator 122, and is configured to be communicatively coupled to the module secure medium interface 118. The authentication medium 112 is communicatively coupled to the host controller 106 and to the host authentication medium interface 114. The host authentication medium interface 114 is communicatively coupled to the authentication medium 112 and to the module authentication medium interface 120. The connection modulator 122 is coupled to the secure medium 108 and the host secure medium interface 110, and is configured to be in an open or closed state to de-establish or establish a connection between the secure medium 108 and the host secure medium interface 110.

The module controller 116 is communicatively coupled to the module secure medium interface 118 and the module authentication medium interface 120. The module secure medium interface 118 is configured to be communicatively coupled to the host secure medium interface 110, and is communicatively coupled to the module controller 116. The module authentication medium interface 120 is communicatively coupled to the host authentication medium interface 114 and to the module controller 116.

In various examples, the host system 102 may include or be coupled to one or more devices configured to exchange information with one another via the secure medium 108. For example, the host system 102 may be a server, such as a microserver, or another type of server. The host system 102 may store or control access to information, such as by controlling access to the secure medium 108 through which information may be selectively accessible to the connected module 104, which may include any device capable of exchanging information with other devices. For example, the secure medium 108 may be a system bus, such as a peripheral component interconnect express (PCIe) or Ethernet bus connection, through which information is exchanged between the devices. The devices may exchange private information via the secure medium 108. Accordingly, it may be advantageous to only allow authorized devices to access the secure medium 108 via the host secure medium interface 110, such that unauthorized devices do not have access to a medium across which such information is exchanged. The connection modulator 122 facilites this selective access by establishing and de-establishing a communicative connection between the secure medium 108 and the host secure medium interface 110.

For example, the connected module 104 may be or include an unauthorized device or component that is attempting to gain access to the secure medium 108. The host system 102 and the connected module 104 may be connected to one another via a backplane in some examples, or another bus or medium in other examples. As discussed above, the host system 102 may include a host PCB, which may be within a host housing in which components of the host system 102 are disposed, and the connected module 104 may include a module PCB, which may be within a module housing in which components of the connected module 104 are disposed. The host PCB may be electrically and/or physically connected to the backplane, or the other bus or the other medium, and the module PCB may be electrically and/or physically connected to the backplane, or the other bus or the other medium, such that the host PCB may be communicatively coupled to the module PCB via the backplane or the other bus or the other medium. In some examples, the host PCB and the module PCB may be implemented within the same housing.

The connected module 104 may wish to exchange information with the host system 102 via the secure medium 108 by sending and/or receiving information between the secure medium interfaces 110, 118. However, as discussed above and as indicated by the phantom connection between the secure medium interfaces 110, 118 and the switchable connection between the secure medium 108 and the host secure medium interface 110 provided by the connection modulator 122, the secure medium 108 may be selectively disconnected from the host secure medium interface 110. The connected module 104 may be unable to access the secure medium 108 before the host system 102 determines that the connected module 104 should be granted access to the secure medium 108 (and private information communicated via the secure medium 108), responsive to which the host system 102 grants the connected module 104 access to the host system 102. Granting the connected module 104 access to the host system 102 may include controlling the connection modulator 122 to be in a closed position to provide a connection between the secure medium 108 and the host secure medium interface 110.

The host system 102 may determine whether to grant the connected module 104 access to the secure medium 108 by performing an authorization procedure via the authentication medium 112. An objective of the authorization procedure may be to determine whether the connected module 104 is a trusted or pre-approved module. The host controller 106 may send challenge information from the authentication medium 112 to the connected module 104, and receive challenge response information from the connected module 104, via the authentication medium interfaces 114, 120. The authentication medium 112 may be a separate medium from the secure medium 108, such as a separate serial communication medium. For example, the authentication medium 112 may be a Universal Serial Bus (USB) connection, a peripheral component interconnect (PCI) connection, a Personal Computer Memory Card International Association (PCMCIA) connection, a Recommended Standard 232 (RS-232) connection, or another type of bus connection across which information can be conveyed, including wireless connections.

The connected module 104 may thus initially communicate with the host system 102 via the authentication medium 112 to exchange a limited amount of information. For example, the host system 102 and the connected module 104 may exchange information that the host system 102 may use to determine whether to grant the connected module 104 access to a broader range of information (including, for example, private information) exchanged via the secure medium 108. If the connected module 104 is so authorized, the host controller 106 may control the connection modulator 122 to switchably connect the secure medium 108 to the host secure medium interface 110 to enable the connected module 104 to exchange information via the secure medium 108 and access data of the host system 102. By exchanging authentication information via a dedicated medium (that is, the authentication medium 112), only authorized devices have access to the secure medium 108 and private information exchanged via the secure medium 108. Accordingly, technological improvements to secure communication are achieved by providing separate communication media.

Figure 2:
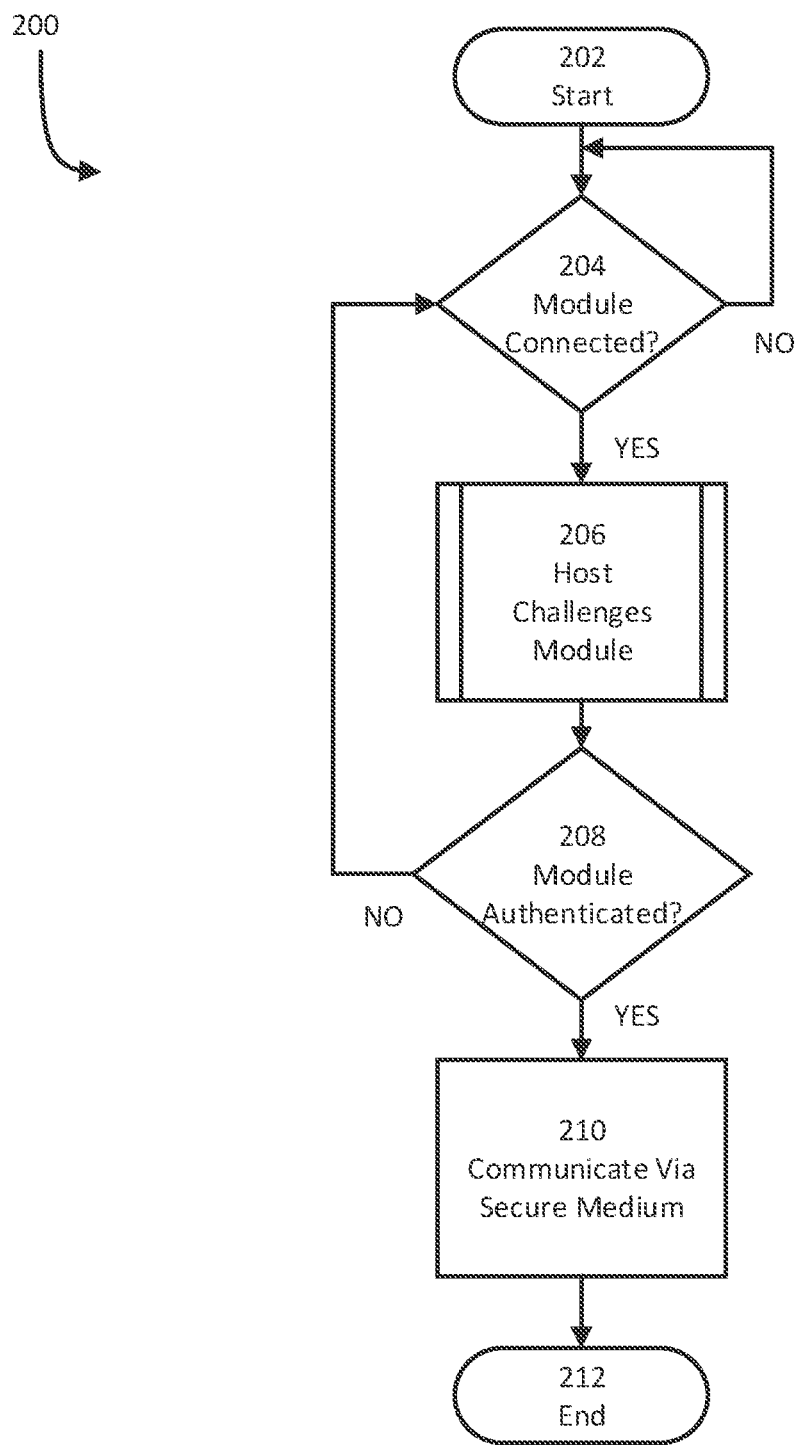
FIG. 2 illustrates a process of operating a communication system according to an example.

FIG. 2 illustrates a process 200 of operating a communication system according to an example. Examples are provided with reference to the communication system 100 for purposes of explanation. However, in other examples, the process 200 may be executed in connection with systems other than the communication system 100. For example, the process 200 may also be executed in connection with the communication system 400 discussed below.

At act 202, the process 200 begins.

At act 204, a determination is made by the host system 102 as to whether a module has been connected to the host system 102. For example, the host system 102 may determine whether the connected module 104 has established a physical connection with the host system 102. The physical connection may be a physical communication connection and/or a physical authentication connection. For example, in establishing the physical connection, one or both of the interfaces 110, 114 may include a physical interface, such as a wired connection port (that is, a female connector), and the physical connection may include a wired connection plug (that is, a male connector) mating with the wired connection port. The wired connection plug may, in turn, be physically coupled to one of the interfaces 118, 120 or an intermediate device. In other examples, other physical connections, including optical connections, may be implemented and detected at act 204. A physical connection between the host secure medium interface 110 and the module secure medium interface 118 may form a physical communication connection, and a physical connection between the host authentication medium interface 114 and the module authentication medium interface 120 may form a physical authentication connection. The host system 102 may determine that the connected module 104 has established a physical connection with the host system 102 based on the host system 102 being able to communicate with the connected module 104 via a physical communication medium, such as the authentication medium 112. In other examples, the host system 102 may determine that the connected module 104 has established a physical connection with the connected module 104 through another means, such as via a sensor or sensors configured to detect a physical proximity of the connected module 104 to the host system 102.

If a determination is made that no module has been connected to the host system 102 (204 NO), then the process 200 returns to act 204. Act 204 may be repeatedly executed until a determination is made that a module has been connected to the host system 102 (204 YES). For example, the host system 102 may periodically determine whether a connection to the host authentication medium interface 114 and/or the host secure medium interface 110 has been made. In another example, the host system 102 may continuously monitor the interfaces 110, 114 to make such a determination. For example, act 204 may include periodically or continuously determining whether a communication has been received from a connected module, such as the connected module 104. In another example, the host system 102 may alternately or additionally execute act 204 responsive to an event occurring, such as the host system 102 or the connected module 104 being powered on. Responsive to determining that the connected module 104 has been connected to the host system 102 (204 YES), the process 200 continues to act 206.

At act 206, the host system 102 challenges the connected module 104. Challenging the connected module 104 may include requesting that the connected module 104 provide authorization information to enable the host system 102 to verify an identify and/or credentials of the connected module 104. For example, act 206 may include the host system 102 challenging the connected module 104 for information that the host system 102 can use to verify that the connected module 104 has authorization information (for example, a private key) corresponding to an authentic entity. For example, a manufacturer or other entity may provide the authorization information to the connected module 104 at a time of manufacture, or another time for configuration, because the connected module 104 is a trusted module that should be granted access to the secure medium 108. The connected module 104 may store the authorization information in memory or storage for later use. The connected module 104 then provides a response to the host system 102 which the host system 102 uses to determine whether the connected module 104 is an authorized device. An example of act 206 is provided in greater detail below with respect to FIG. 3.

At act 208, a determination is made by the host system 102 as to whether the connected module 104 successfully generated an appropriate challenge response indicative of the connected module 104 being an authorized module. If the connected module 104 did not successfully generate a correct challenge response and is therefore not an authorized module (208 NO), then the process 200 returns to act 204. In some examples, the connected module 104 may be permanently or temporarily locked-out from attempting to become authenticated if the connected module 104 fails to generate a correct challenge response. Otherwise, if the connected module 104 successfully generated a correct challenge response and is therefore an authorized module (208 YES), then the process 200 continues to act 210.

At act 210, the connected module 104 communicates with other devices via the secure medium 108. For example, the host system 102 may include or be connected to one or more authorized devices exchanging private information via the secure medium 108. The connected module 104 is an authorized device as a result of successfully responding to the challenge of the host system 102 at act 206, and consequently is capable of accessing the secure medium 108 via the secure medium interfaces 110, 118. Accordingly, the connected module 104 is capable of sending and receiving private information via the secure medium 108 as a result of becoming an authorized device.

At act 212, the process 200 ends.

In some examples, a process of operating a communication system may include additional, fewer, and/or different acts. For example, act 206 may be executed based on conditions other than determining that a module has been connected to the host system 102, as discussed above with respect to act 204. In various examples, the host system 102 may challenge the connected module 104 responsive to alternate conditions being met. For example, the host system 102 may challenge the connected module 104 responsive to receiving a signal from the connected module 104. The signal may be, for example, a request to transmit information to the host system 102, or may be the information to be transmitted to the host system 102 itself. In other examples, the host system 102 may challenge the connected module 104 responsive to other conditions being met other than the connected module 104 being connected to the host system 102.

Figure 3:
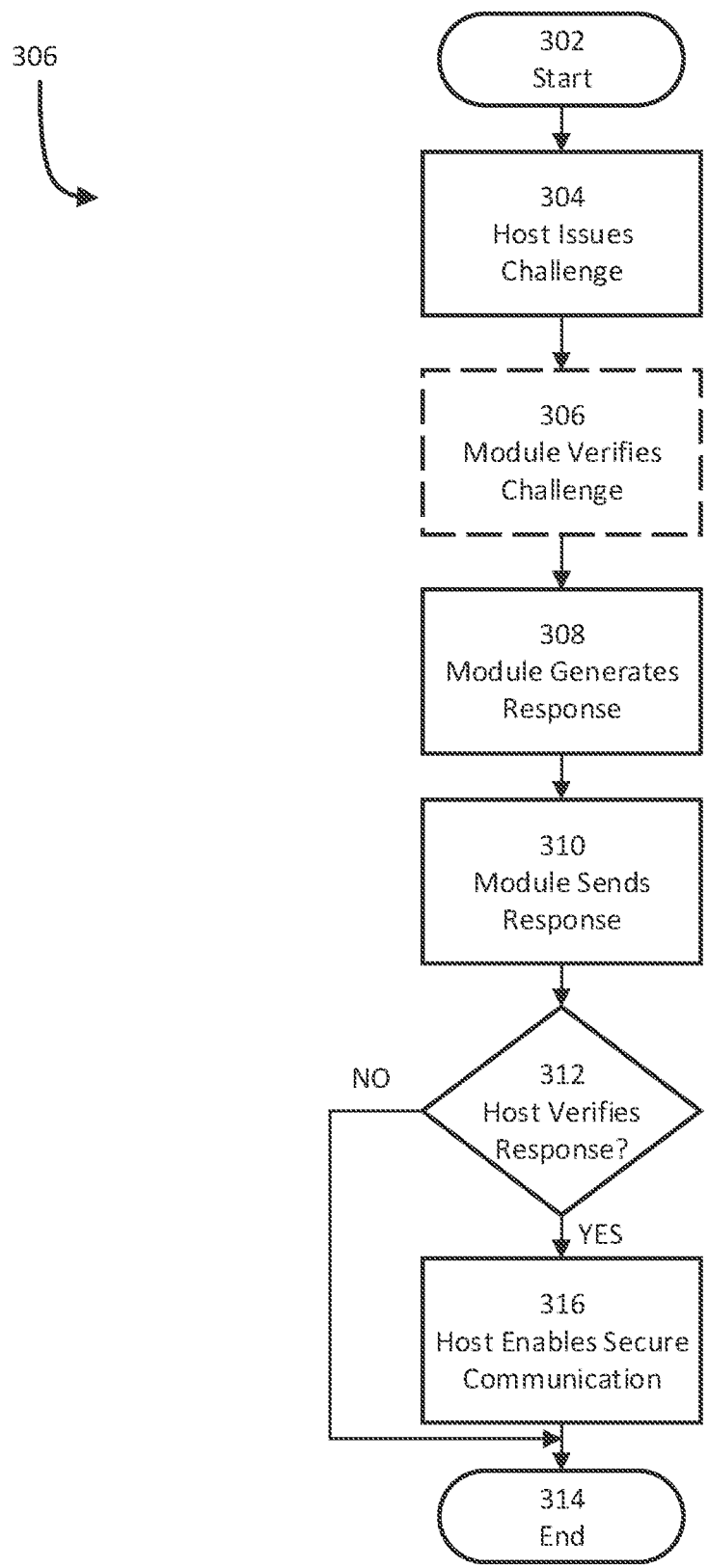
FIG. 3 illustrates a process of executing an authentication challenge according to an example.

As discussed above, act 206 includes the host system 102 challenging the connected module 104. FIG. 3 illustrates a process 300 that is an example of act 206 according to an embodiment. For example, the process 300 may be executed by the host system 102 and the connected module 104.

At act 302, the process 300 begins.

At act 304, the host system 102 issues a challenge to the connected module 104. Issuing the challenge may include the host system 102 sending a request from the authentication medium 112, via the host authentication medium interface 114, to the module authentication medium interface 120. The request may include a value or other information for the connected module 104 to sign and return to the host system 102. The value or other information may be uniquely correlated to the connected module 104 in some examples, or may not be uniquely correlated to the connected module 104 in other examples. In some examples, the host system 102 may sign the request with a private key prior to sending the request to the connected module 104. In other examples, the host system 102 may not sign the request with the private key.

At optional act 306, the connected module 104 verifies the challenge. Act 306 may be optionally executed by the module controller 116 where, for example, the request received from the host system 102 is signed by the host system 102. For example, the host system 102 may sign the request at act 304 using a private key prior to sending the signed request to the connected module 104. Signing the request using the private key may include encrypting the request using the private key. Act 306 may include the connected module 104 using a public key corresponding to the host system 102 to verify that the signed request was signed by the host system 102, such that the connected module 104 can verify that the signed request was in fact sent by the host system 102. For example, the module controller 116 may include, or be coupled to, a storage or memory storing a copy of the public key of the host system 102. Using the public key may include decrypting the signed, or encrypted, response using the public key. In other examples, such as examples in which the host system 102 does not sign the request, act 306 may not be executed. Furthermore, in some examples, act 306 may be optionally executed but may include a verification operation that does not involve private and/or public keys in the manner provided in the example above.

At act 308, the connected module 104 generates a response to the request received from the host system 102. The module controller 116 may use information from the received request to generate a response. For example, the response may be, include, or be generated based on a value or other information included in the received request, such that the host system 102 can correlate the response to the request. The module controller 116 may use a private key of the connected module 104 (for example, a private key stored in storage or memory included in or accessible to the module controller 116) to sign the generated response. Signing the generated response may include encrypting the generated response using the private key. In other examples, the connected module 104 may generate the response in another manner other than by using a private and/or public key in the manner discussed above, such that a recipient of the generated response can verify that the connected module 104 generated the response.

At act 310, the connected module 104 sends the response to the host system 102. For example, the connected module 104 may send the response to the host system 102 from the module authentication medium interface 120 to the host authentication medium interface 114. The response is provided to the host controller 106 via the authentication medium 112 in this example. The host system 102 may then attempt to verify the received response.

At act 312, a determination is made by the host system 102 as to whether the received response is verified. For example, in examples in which the connected module 104 signs the response using a private key of the connected module 104 at act 308, the host system 102 may use a stored public key corresponding to the private key of the connected module 104 to verify that an appropriate private key was used by the connected module 104 to generate the challenge response. Using the public key to verify that an appropriate private key was used may include decrypting the signed, or encrypted, challenge response using the public key. For example, the host system 102 may receive public keys for storage from a manufacturer, designer, or other entity capable of controlling which devices are to be authorized devices by selectively providing public keys of trusted modules to the host system 102. Similarly, the manufacturer, designer, or other entity may selectively provide private keys to connected modules, such as the connected module 104, intended to be authorized devices.

If the host system 102 does not successfully verify the response (312 NO), then the process 300 continues to act 314, where the process 300 ends. For example, the host system 102 may be unable to successfully verify the response (312 NO) (that is, the verification may be unsuccessful) because the response was not signed by a private key corresponding to a public key used by the host system 102 to verify the received response. In another example, the response may have been properly signed by an appropriate private key, but the response may not include information necessary for verification. As discussed above, the connected module 104 may generate the response based on a value or information included in the request initially sent by the host system 102. If the connected module 104 does not do so in a situation in which the host system 102 expects the response to include or be based on such a value or information, then the host system 102 may be unable to verify the response (312 NO) even if the response was properly signed. In examples in which the process 300 is an example of act 206, the process 300 may end and return to the process 200 at act 208, where a determination is made that the connected module 104 is not authenticated (208 NO).

Otherwise, if the host system 102 successfully verifies the response (312 YES), then the process 300 continues to act 316. For example, the host system 102 may successfully verify the response by using a public key corresponding to the private key used by the connected module 104 to sign the received response. That is, the verification may be successful if the public key is determined to correspond to the private key used by the connected module 104 to sign the received response. The host system 102 may use the public key to access information in the response, which may include or be based on information included in the request sent by the host system 102 to the connected module 104. As discussed above, the host system 102 may have included a value or other information in the request that the connected module 104 may have generated the response based on. Accordingly, the host system 102 may verify that the response was generated based on the information included in the request, such that the host system 102 can verify that the response was generated by an entity that received the request, and the contents thereof, sent by the host system 102.

At act 316, the host system 102 enables secure communication with the connected module 104. For example, the host system 102 may enable secure communication between the secure medium 108 and the connected module 104 via the interfaces 110, 118. As illustrated diagrammatically in FIG. 1, the host controller 106 is capable of switchably disconnecting the secure medium 108 from the host secure medium interface 110 via the connection modulator 122 such that, even if a device is connected to the host secure medium interface 110, the device may still be unable to access the secure medium 108 if the host controller 106 does not enable a connection between the host secure medium interface 110 and the secure medium 108.

In some examples, the connection modulator 122 may be implemented as a multiplexer. The multiplexer 122 may include an electrical switch configured to control an electrical connection between the secure medium 108 and the host secure medium interface 110, and/or a network switch, such as an Ethernet switch, having one or more communication ports that are selectively controllable between an enabled state, in which information can pass between the secure medium 108 and the host secure medium interface 110, and a disabled state, in which information cannot pass between the secure medium 108 and the host secure medium interface 110.

Accordingly, act 316 may include closing an electrical switch, enabling a network port, or another act of enabling communication between the secure medium 108 and an entity communicatively coupled to the host secure medium interface 110 via the connection modulator 122, such as the connected module 104, such that the entity may access private information of the host system 102. The process 300 then continues to act 314 and ends, with the connected module 104 being authenticated to the host system 102 and capable of subsequently communicating via the secure medium 108. For example, where the process 300 is an example of act 206, the process 300 may end and return to the process 200 at act 208, where a determination is made that the connected module 104 is authenticated (208 YES) and can thereafter communicate via the secure medium 108 at act 210.

In some examples, acts of the processes 200, 300 discussed above may not be executed. For example, one or more interrupt conditions may be implemented which, if satisfied, may interrupt execution of the processes 200, 300. Interrupt conditions may include, for example, power to one or more components of the communication system 100 being lost (for example, power to the host system 102 being lost) or detecting certain activity, such as suspicious activity (for example, detecting a suspecting hacking attempt on the host system 102). Interrupt conditions may include other conditions which may or may not be specified by a user.

One or more actions may be taken in response to an interrupt condition being satisfied. For example, if the host system 102 and the connected module 104 are in the midst of executing the process 200, the process 200 may be reset or paused, such as being reset when, and/or paused until, the cause or subject of the interrupt condition is addressed (for example, by restoring power to the communication system 100 where the interrupt condition is power to the communication system 100 having been lost). In some examples, modules that have already been authenticated to the host system 102 may need to be re-authenticated to the host system 102, such as by the process 200 being executed, responsive to one or more of the interrupt conditions being met. That is, authenticated modules may be "de-authenticated" responsive to certain interrupt conditions being met in some examples, requiring the now-de-authenticated modules to be re-authenticated to the host system 102 before access to the secure medium 108 is restored to the now-de-authenticated modules. It is to be appreciated that the communication system 100 may monitor for one or more interrupt conditions regardless of whether or not one or both of the processes 200, 300 is in the process of being executed.

Examples have been provided of the host system 102 authenticating the connected module 104 via the authentication medium 112 prior to granting the connected module 104 access to the secure medium 108, across which private information is exchanged. For example, private information may be exchanged between several modules. In some examples, a host system may be connected to several modules and may individually authenticate each connected module via a dedicated authentication medium prior to granting a respective module access to a secure communication medium.

Figure 4:
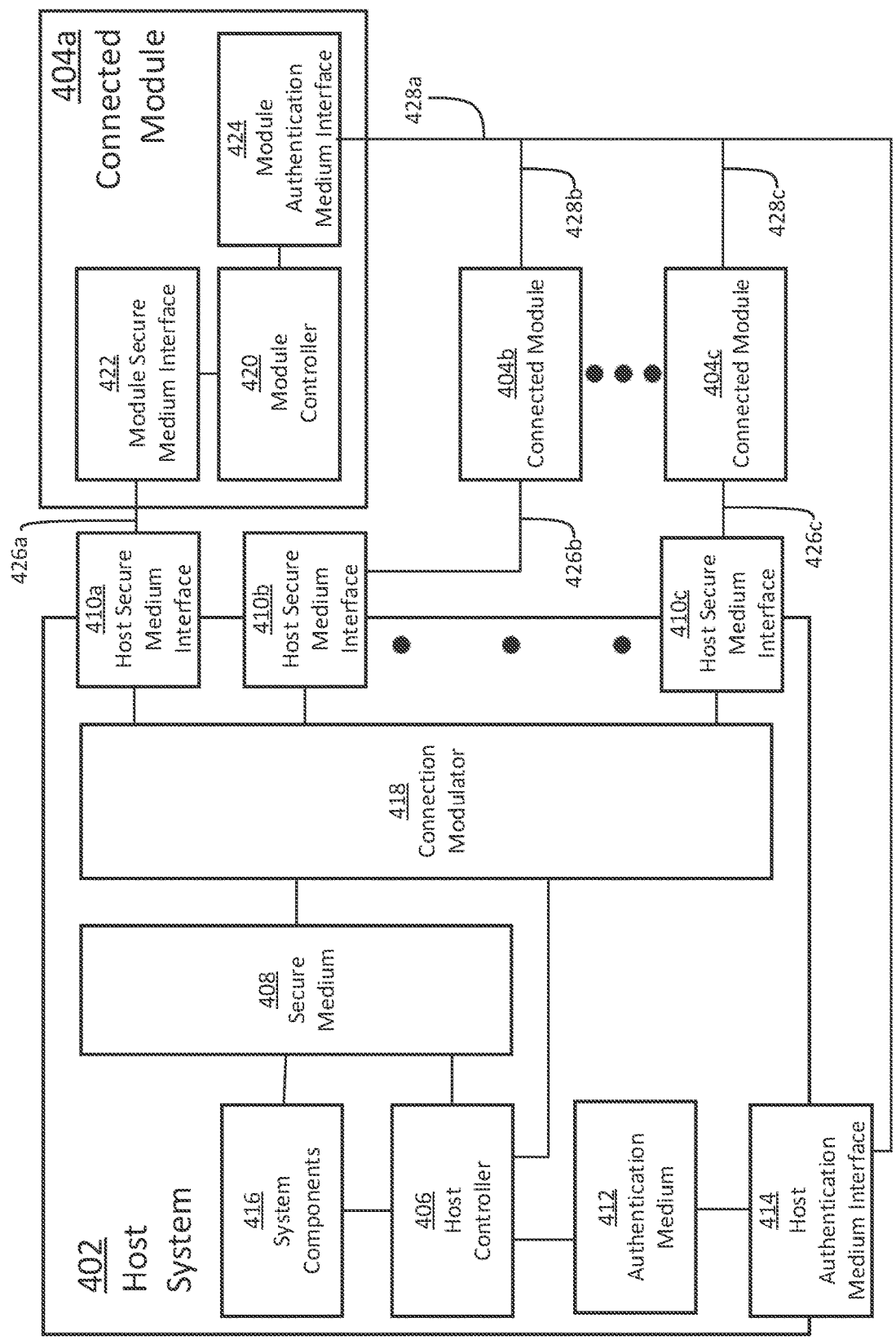
FIG. 4 illustrates a block diagram of a communication system according to an example.

FIG. 4 illustrates a block diagram of a communication system 400 according to an example. The communication system 400 includes a host system 402 and connected modules 404 including a first connected module 404a, a second connected module 404b, and a third connected module 404c. The host system 402 may be substantially similar to the host system 102, but is illustrated in greater detail and is illustrated as being coupled to multiple connected modules 404, each of which may be substantially similar to one another and to the connected module 104.

The host system 402 includes a host controller 406, a secure medium 408, a first host secure medium interface 410a, a second host secure medium interface 410b, a third host secure medium interface 410c, an authentication medium 412, a host authentication medium interface 414, system components 416, and a connection modulator 418. The connected module 404a includes a module controller 420, a module secure medium interface 422, and a module authentication medium interface 424. In various examples, each of the connected modules 404b, 404c may include substantially similar components as the connected module 404a.

The host controller 406 is communicatively coupled to the secure medium 408, the authentication medium 412, the system components 416, and the connection modulator 418. The secure medium 408 is communicatively coupled to the host controller 406, the system components 416, and the connection modulator 418, and is selectively communicatively coupled to the host secure medium interfaces 410 via the connection modulator 418. The host secure medium interfaces 410a, 410b, 410c are coupled to the connected modules 404a, 404b, 404c, respectively, the first host secure medium interface 410a being coupled to the module secure medium interface 422, and are coupled to the connection modulator 418. For example, the host secure medium interface 410a may form a physical communication connection 426a with the connected module 404a, the host secure medium interface 410b may form a physical communication connection 426b with the connected module 404b, and the host secure medium interface 410c may form a physical communication connection 426c with the connected module 404c, with the host secure medium interface 410a forming the physical communication connection 426a with the module secure medium interface 422. Each of the host secure medium interfaces 410 may be individually selectively communicatively coupled to the secure medium 408 via the connection modulator 418.

The authentication medium 412 is communicatively coupled to the host controller 406 and to the host authentication medium interface 414. The host authentication medium interface 414 is communicatively coupled to the authentication medium 412 and to each of the connected modules 404. For example, the host authentication medium interface 414 may form a physical authentication connection 428a with the connected module 404a, a physical authentication connection 428b with the connected module 404b, and a physical authentication connection 428c with the connected module 404c, with the host authentication medium interface 414 forming the physical authentication connection 428a with the module authentication medium interface 424. The system components 416 are coupled to the host controller 406 and to the secure medium 408. The connection modulator 418 is communicatively coupled to the host controller 406, the secure medium 408, and to the host secure medium interfaces 410.

The module controller 420 is communicatively coupled to the secure medium interface 422 and to the module authentication medium interface 424. The secure medium interface 422 is communicatively coupled to the first host secure medium interface 410a and to the module controller 420. The module authentication medium interface 424 is communicatively coupled to the module controller 420 and to the host authentication medium interface 414.

The host system 402 operates substantially similarly as the host system 102, and is configured to authenticate each of the connected modules 404 via the authentication medium 412 prior to granting each respective one of the connected modules 404 access to the secure medium 408. Modules having access to the secure medium 408 may be capable of exchanging private information via the secure medium 408 with other devices or entities, such as the other connected modules 404, the system components 416, and so forth. For example, the secure medium 408 may include a system bus, and the system components 416 may include one or more processing units, memory or storage units, and/or input/ output components, and so forth. In some examples, the host controller 406 may include some or all of the system components 416.

If the host system 402 successfully authenticates a connected module, such as by executing the process 200 and determining that the connected module is an authorized module, the connected module is allowed to communicate via the secure medium 408. For example, using the first connected module 404a as an example, the host controller 406 may control the connection modulator 418 to enable communication between the first host secure medium interface 410a and the secure medium 408 responsive to determining that the first connected module 404a is authorized to communicate via the secure medium 408.

In some examples, the connection modulator 418 may include a component or device configured to selectively enable communication between the secure medium 408 and each of the host secure medium interfaces 410 on an individual basis. For example, the connection modulator 418 may include a multiplexer having a first connection communicatively coupled to the secure medium 408 and a second set of connections each coupled to a respective one of the host secure medium interfaces 410. The first connection may be selectively switchably connected to each connection of the second set of connections. For example, the connection modulator 418 may include a multiplexer having one or more electrical switches, each configured to open or close an electrical connection between the secure medium 408 and a respective one of the host secure medium interfaces 410, and/or may include one or more network switches having communication ports connecting the secure medium 408 to the host secure medium interfaces 410 which can be selectively enabled or disabled.

In other examples, the connection modulator 418 may include a multiplexer configured to selectively control a communicative connection between the secure medium 408 and each of the host secure medium interfaces 410 via another implementation other than electrical and/or network switches. For example, a multiplexer may include one or more optocouplers configured to selectively establish or de-establish (for example, isolate) an optical connection between the secure medium 408 and each of the host secure medium interfaces 410. and in still other examples, the connection modulator 418 may include one or more devices or components other than or including multiplexers configured to selectively control a connection between the secure medium 408 and each of the host secure medium interfaces 410.

Examples have been provided in which a host system, such as the host system 102 or host system 402, controls access to a secure communication medium or media. The host system may include devices, components, or modules that exchange private information, and/or may act as or provide a medium through which private information may be exchanged. To access the secure medium or media and the private information, a module, which may include one or more devices and/or components, is authenticated by the host system via an authentication medium or media separate from the secure medium or media. The module may be authenticated responsive to being physically connected to the host system. The host system may be connected to one or more modules, and may authenticate each module on an individual basis prior to granting each respective module access to the secure medium or media. In some examples, the secure medium and authentication medium may include physical media. For example, the secure medium may include a system bus, such as PCIe or Ethernet, and the authentication medium may include a point-to-point connection such as USB or serial. In other examples, the secure medium and authentication medium may include other examples of communication media, such as wired or wireless media not specifically identified above.

In some examples, a host system, such as the host system 102 or host system 402, may authenticate modules on a group basis, rather than on an individual basis. For example, the host system may simultaneously authenticate one or more modules. Authentication of one connected module may be contingent on authentication of one or more other modules. For example, a host system may only grant a group of modules access to a secure medium if each of the connected modules is individually authenticated. In some examples, the host system may grant a group of modules access to a secure medium based on an authentication of a subset of the group of modules. For example, a host system (such as the host system 102 or host system 402) may authenticate a single connected module (such as the connected module 104 or the connected modules 404) by executing an authentication process (such as the processes 200, 300) and, if the host system authenticates the single connected module, may grant a group of connected modules access to a secure medium (such as the secure medium 108) without having individually communicated with each of the connected modules in the group of connected modules. Similarly, de-authentication of one or more modules may be contingent on authentication or de-authentication of one or more other modules and may be performed on a group or individual basis, whether simultaneously or otherwise.

Various controllers, such as the controllers 106, 116, 406, and 420, may execute various operations discussed above. Using data stored in associated memory and/or storage, the controllers may also execute one or more instructions stored on one or more non-transitory computer-readable media that may result in manipulated data. In some examples, the controllers may include one or more processors or other types of controllers. In one example, the controllers are or include a commercially available, general-purpose processor. In another example, the controllers perform at least a portion of the operations discussed above using an application-specific integrated circuit tailored to perform particular operations in addition to, or in lieu of, a general-purpose processor. As illustrated by these examples, examples in accordance with the present invention may perform the operations described herein using many specific combinations of hardware and software and the invention is not limited to any particular combination of hardware and software components.

In some examples, the controllers 106, 116, 406, 420 may be implemented to include or be one or more integrated circuits. For example, the host controllers 106, 406 may each include one or more integrated circuits configured to perform operations discussed above, including one or more of generating a challenge, encrypting the challenge using a private key, communicating the challenge, receiving a challenge response, decrypting the challenge response using a public key, and verifying the challenge response. The module controllers 116, 420 may similarly include one or more integrated circuits configured to perform operations discussed above, including receiving a challenge, decrypting the challenge using a public key, generating a challenge response, encrypting the challenge response using a private key, and communicating the challenge response.

In various examples, a connected module may be authenticated on a basis other than, or in addition to, implementing a private/public key infrastructure. For example, at act 312, a host system may determine whether a connected module contains certain components or parts. Such a determination may include determining whether the connected module includes parts manufactured by a particular manufacturer to verify, at act 312, that the connected module does not include any counterfeit or non-approved parts. To execute such a determination, the host system may obtain information from the connected module indicative of a manufacturer of the connected module, and/or a part or model number indicative of the particular component being analyzed. For example, the host system may request or otherwise obtain the information from the connected module by issuing a challenge at act 304.

The connected module may generate a response including the manufacturer, part, and/or model identification information at act 308 and send it to the host system at act 310. In one example, at act 312, the host system may determine whether the manufacturer and/or part or model number are on a list of approved, or whitelisted, manufacturers and/or parts or models, and may verify those connected modules having components corresponding to the approved list at act 312. That is, verification may be determined to be successful where the connected modules have components (for example, all components or a minimum number thereof) corresponding to the approved list. Otherwise, verification may be unsuccessful. In another example, the host system may determine whether the manufacturer and/or part or model number are on a list of disapproved, or blacklisted, manufacturers and/or parts or models, and may verify those connected modules that do not correspond to the disapproved list at act 312. That is, verification may be successful where the connected modules have components (for example, all components or a minimum number thereof) that do not correspond to the disapproved list. Otherwise, verification may be unsuccessful. In other examples, a combination of white- and blacklists may be implemented in addition to, or in lieu of, the public/private key infrastructure to verify a response or connected module at act 312. In still other examples, additional or different acts may be taken to authenticate a connected module and verify a response, such as by requiring a user to perform a visual inspection of the connected module and instructing the host system that the connected module passed the visual inspection (for example, by determining that the connected module looks like an approved module) prior to authenticating the connected module.

Examples provided by the disclosure provide technological improvements to various technical fields. For example, the examples provided by the disclosure provide technological improvements to secure communications by mitigating or preventing snooping and/or cloning on secure media. This is a technical problem solved by the technical solutions provided herein, thereby providing technological improvements to the technical field of secure communications. The examples provided by the disclosure also enable a host system to selectively allow access to a secure medium or media only for certain components or devices, such as components or devices that are compatible with the host system or that are approved (for example, genuine) parts. This is also a technical problem solved by the technical solutions provided herein, thereby providing technological improvements to the technical field of device access control.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. A host system comprising:
an authentication communication medium interface configured to be communicatively coupled to a connected module;
an authentication communication medium coupled to the authentication communication medium interface;
a secure communication medium interface physically separate and decoupled from the authentication communication medium interface and configured to be communicatively coupled to the connected module in parallel with the authentication communication medium interface;
a secure communication medium physically separate and decoupled from the authentication communication medium and being configured to be switchably coupled to the secure communication medium interface; and
a controller coupled to the authentication communication medium and the secure communication medium and being configured to:
detect a connection of the connected module to the host system over a physical communication connection;
generate an authentication challenge;
provide the authentication challenge to the connected module over a physical authentication connection via the authentication communication medium and the authentication communication medium interface;
receive a challenge response to the authentication challenge from the connected module via the authentication communication medium and the authentication communication medium interface;
verify the challenge response;
grant the connected module access to host system data on the secure communication medium over the physical communication connection via the secure communication medium interface based on successful verification of the challenge response, wherein granting the connected module access to the host system data on the secure communication medium includes physically coupling the secure communication medium to the secure communication medium interface; and
deny the connected module access to host system data on the secure communication medium based on unsuccessful verification of the challenge response, wherein denying the connected module access to the host system data on the secure communication medium includes
maintaining a physical decoupling between the secure communication medium and the secure communication medium interface, and
maintaining the physical authentication connection between the authentication communication medium and the connected module.

2. The host system of claim 1, wherein the controller is further configured to sign the authentication challenge with a private key of the host system.

3. The host system of claim 1, wherein verifying the challenge response comprises decrypting the challenge response using a public key of the connected module.

4. The host system of claim 1, further comprising a multiplexer, the multiplexer being configured to selectively connect the connected module to the secure communication medium via the secure communication medium interface to grant the connected module access to the host system data over the physical communication connection responsive to the controller successfully verifying the challenge response.

5. The host system of claim 4, wherein the multiplexer includes at least one of an electrical switch or an optocoupler switchably connecting the connected module to the secure communication medium, and wherein selectively connecting the connected module to the secure communication medium includes controlling, by the controller, the multiplexer to operate the at least one of the electrical switch or the optocoupler to connect the connected module to the secure communication medium.

6. The host system of claim 4, wherein the multiplexer includes a network switch having a communication port communicatively coupled to the connected module, and wherein selectively connecting the connected module to the secure communication medium includes operating, by the controller, the network switch to enable the communication port.

7. The host system of claim 1, wherein the physical authentication connection is a serial bus connection.

8. The host system of claim 7, wherein the serial bus connection includes at least one of a Universal Serial Bus, peripheral component interconnect, Personal Computer Memory Card International Association, or Recommended Standard 232 connection.

9. The host system of claim 1, wherein the physical communication connection includes at least one of a peripheral component interconnect express connection or a local area network connection.

10. The host system of claim 1, further comprising a host printed circuit board (PCB) configured to be coupled to a backplane, wherein the backplane includes the physical communication connection and the physical authentication connection, and wherein the connected module includes a module PCB configured to be coupled to the backplane.

11. The host system of claim 1, wherein the controller generates the authentication challenge responsive to detecting the connection of the connected module to the host system.

12. A non-transitory computer-readable medium storing thereon sequences of computer-executable instructions for controlling access to a physical communication connection of a host system including an authentication communication medium, an authentication communication medium interface coupled to the authentication communication medium, a secure communication medium interface physically separate and decoupled from the authentication communication medium interface and configured to be communicatively coupled to a connected module in parallel with the authentication communication medium interface, and a secure communication medium physically separate and decoupled from the authentication communication medium and switchably couplable to the secure communication medium interface, the sequences of computer-executable instructions including instructions that instruct at least one processor to:
    detect, by the host system, a connection of the connected module to the host system over the physical communication connection;
    generate an authentication challenge;
    provide the authentication challenge to the connected module over a physical authentication connection via the authentication communication medium and the authentication communication medium interface;
    receive a challenge response to the authentication challenge from the connected module via the authentication communication medium and the authentication communication medium interface;
    verify the challenge response;
    grant the connected module access to host system data on the secure communication medium over the physical communication connection based on successful verification of the challenge response, wherein granting the connected module access to the host system data on the secure communication medium includes physically coupling the secure communication medium to the secure communication medium interface; and
    deny the connected module access to host system data on the secure communication medium based on unsuccessful verification of the challenge response, wherein denying the connected module access to the host system data on the secure communication medium includes
        maintaining a physical decoupling between the secure communication medium and the secure communication medium interface, and
        maintaining the physical authentication connection between the authentication communication medium and the connected module.

13. The non-transitory computer-readable medium of claim 12, wherein generating the authentication challenge includes signing the authentication challenge with a private key of the host system.

14. The non-transitory computer-readable medium of claim 12, wherein verifying the challenge response includes decrypting the challenge response using a public key of the connected module.

15. The non-transitory computer-readable medium of claim 12, wherein the host system includes a multiplexer, wherein granting the connected module access to the host system data over the physical communication connection includes operating the multiplexer to operate at least one of an electrical switch or an optocoupler to couple the connected module to the secure communication medium.

16. The non-transitory computer-readable medium of claim 12, wherein the host system includes a network switch having a communication port communicatively coupled to the connected module, and wherein granting the connected module access to the host system data includes operating the network switch to enable the communication port.

17. The non-transitory computer-readable medium of claim 12, wherein the providing the authentication challenge to the connected module via the physical authentication connection includes providing the authentication challenge to the connected module via a serial bus connection.

18. The non-transitory computer-readable medium of claim 17, wherein the serial bus connection includes at least one of a Universal Serial Bus, peripheral component interconnect, Personal Computer Memory Card International Association, or Recommended Standard 232 connection.

19. The non-transitory computer-readable medium of claim 12, wherein granting the connected module access to the physical communication connection includes granting the connected module access to at least one of a peripheral component interconnect express connection or a local area network connection.

20. A connected module comprising:
    a module authentication medium interface configured to be communicatively coupled to a host system;
    a module secure medium interface different from the module authentication medium interface and configured to be communicatively coupled to the host system in parallel with the module authentication medium interface; and
    a module controller configured to:

receive, from a host authentication communication medium of the host system via the module authentication medium interface, an authentication challenge;

generate an authentication challenge response to the authentication challenge;

provide the authentication challenge response to the host authentication communication medium of the host system over a physical authentication connection between the module authentication medium interface and the host authentication communication medium via the module authentication medium interface, wherein the module authentication medium interface is physically coupled to the host authentication communication medium prior to the connected module being successfully verified by the host system; and receive access to a secure communication medium of the host system via the module secure medium interface based on successful verification of the authentication challenge response, wherein the secure communication medium is switchably coupled to the module secure medium interface, wherein receiving access to the secure communication medium of the host system includes the connected module and the module secure medium interface being physically coupled to the secure communication medium of the host system, and wherein the connected module and the module secure medium interface remain physically decoupled from the secure communication medium prior to the successful verification of the authentication challenge response, the connected module is physically coupled to both the host authentication communication medium and the secure communication medium after the successful verification of the authentication challenge response, and the connected module remains physically coupled to the host authentication communication medium based on unsuccessful verification of the authentication challenge response.

\* \* \* \* \*